United States Patent
Widman et al.

[11] Patent Number: 5,916,494
[45] Date of Patent: *Jun. 29, 1999

[54] ROTATIONAL INDEXING BASE CURVE DEPOSITION ARRAY

[75] Inventors: Michael F. Widman; Henri A. Dagobert, both of Jacksonville; Edmund C. Rastrelli, Atlantic Beach, all of Fla.

[73] Assignee: Johnson & Johnson Vision Products, Inc., Jacksonville, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,156

[22] Filed: Dec. 29, 1995

[51] Int. Cl.$^6$ .................................................. B29D 11/00
[52] U.S. Cl. ........................... 264/1.1; 264/2.1; 264/2.5; 425/150; 425/449; 425/452; 425/808
[58] Field of Search ............................. 264/1.1, 2.1, 2.5; 425/138, 150, 177, 449, 452, 453, 808, 454

[56] References Cited

U.S. PATENT DOCUMENTS

| | | | |
|---|---|---|---|
| 4,383,672 | 5/1983 | Kreuttner | 425/808 |
| 4,407,766 | 10/1983 | Haardt et al. | 264/2.2 |
| 4,786,444 | 11/1988 | Hwang | 425/808 |
| 4,836,960 | 6/1989 | Spector et al. | 425/808 |
| 4,874,561 | 10/1989 | Spector | 425/808 |
| 5,611,970 | 3/1997 | Apollonio et al. | 264/2.5 |

FOREIGN PATENT DOCUMENTS

WO 95/20483  8/1992  WIPO .

Primary Examiner—Mathieu D. Vargot

[57] ABSTRACT

A rotational indexing base curve deposition array for assembling contact lens base curves and front curves with a prescribed and programmable angular orientation to produce a contact lens having a selected axis placement therein, such as a toric axis for a toric contact lens. An array of front curve molds are arranged in a support pallet with a dosed amount of monomer mixture deposited into each of the front curve molds. An array of deposition tubes, positioned in a support plate and coupled to a vacuum source, is used to pick up and support an array of base curve molds. Each of the deposition tubes is then angularly rotated in to the support plate to a selected angularly indexed position therein. A common angular rotational drive is coupled to each of the deposition tubes in the array to angular index each of the deposition tubes to a precise angular position in the support plate. The common angular rotational drive is driven by a stepper motor which can be controlled in a programmable manner to change the selected angularly indexed position. The stepper motor drives moveable racks, which drive pinion gears around the deposition gears. The angularly indexed array of base curve molds is then assembled over the array of front curve molds to produce toric lenses having first and second optical surfaces which are precisely angularly indexed relative to each other.

25 Claims, 8 Drawing Sheets

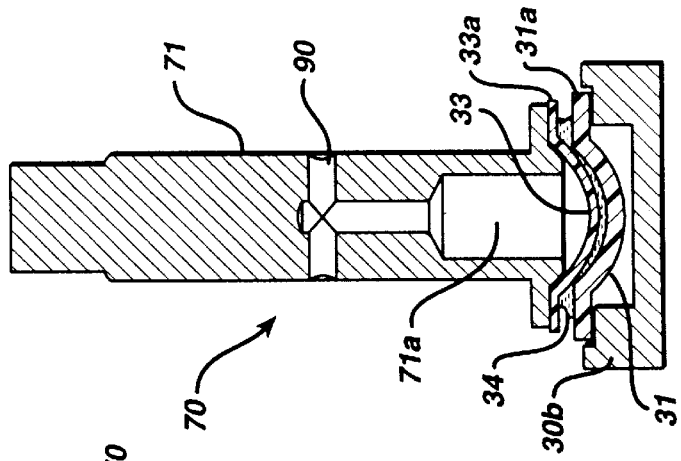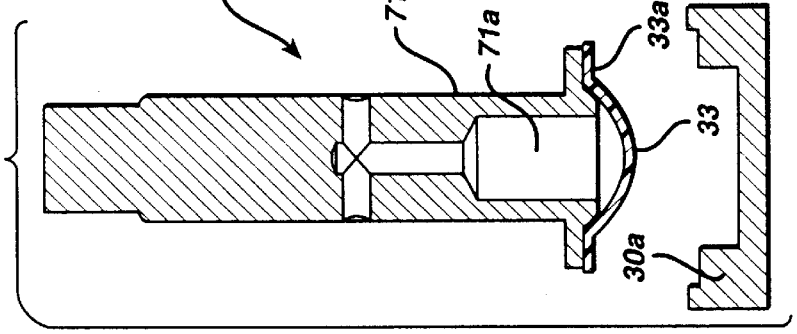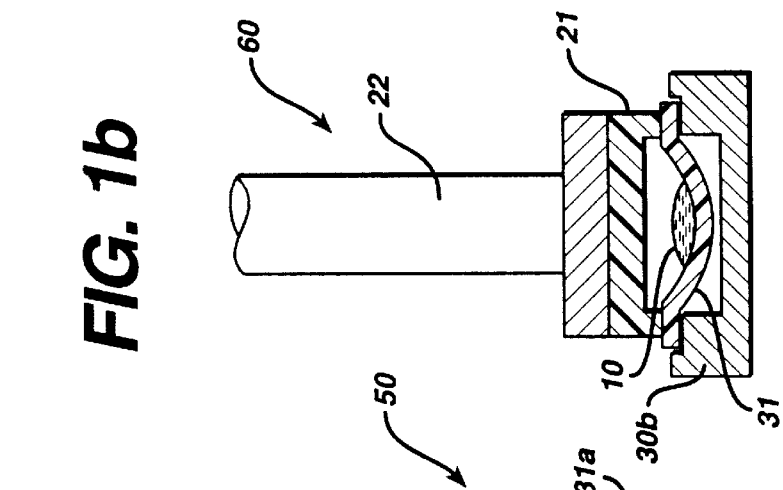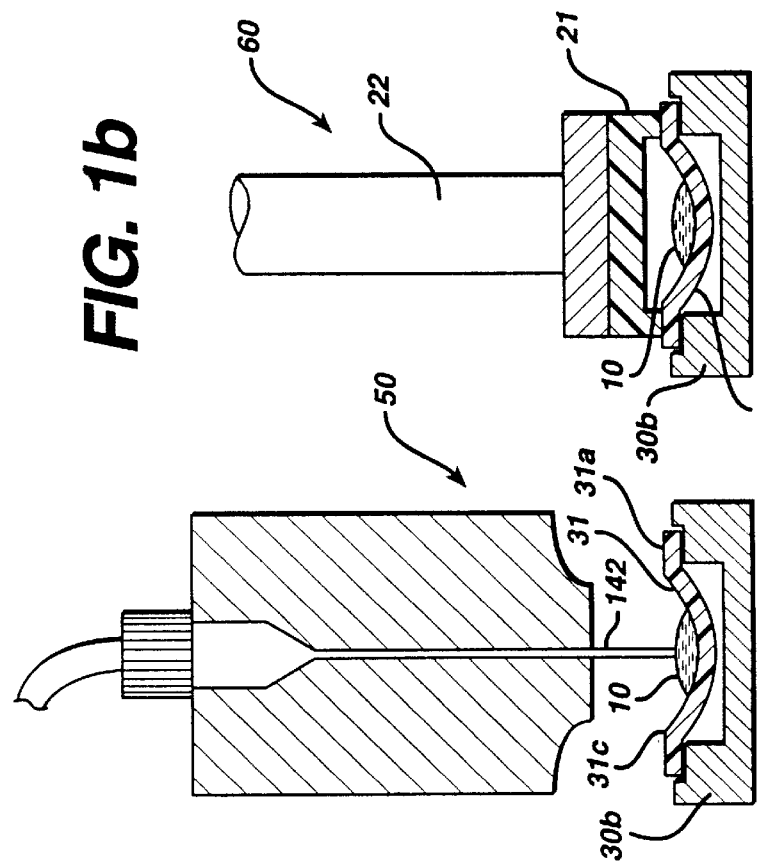

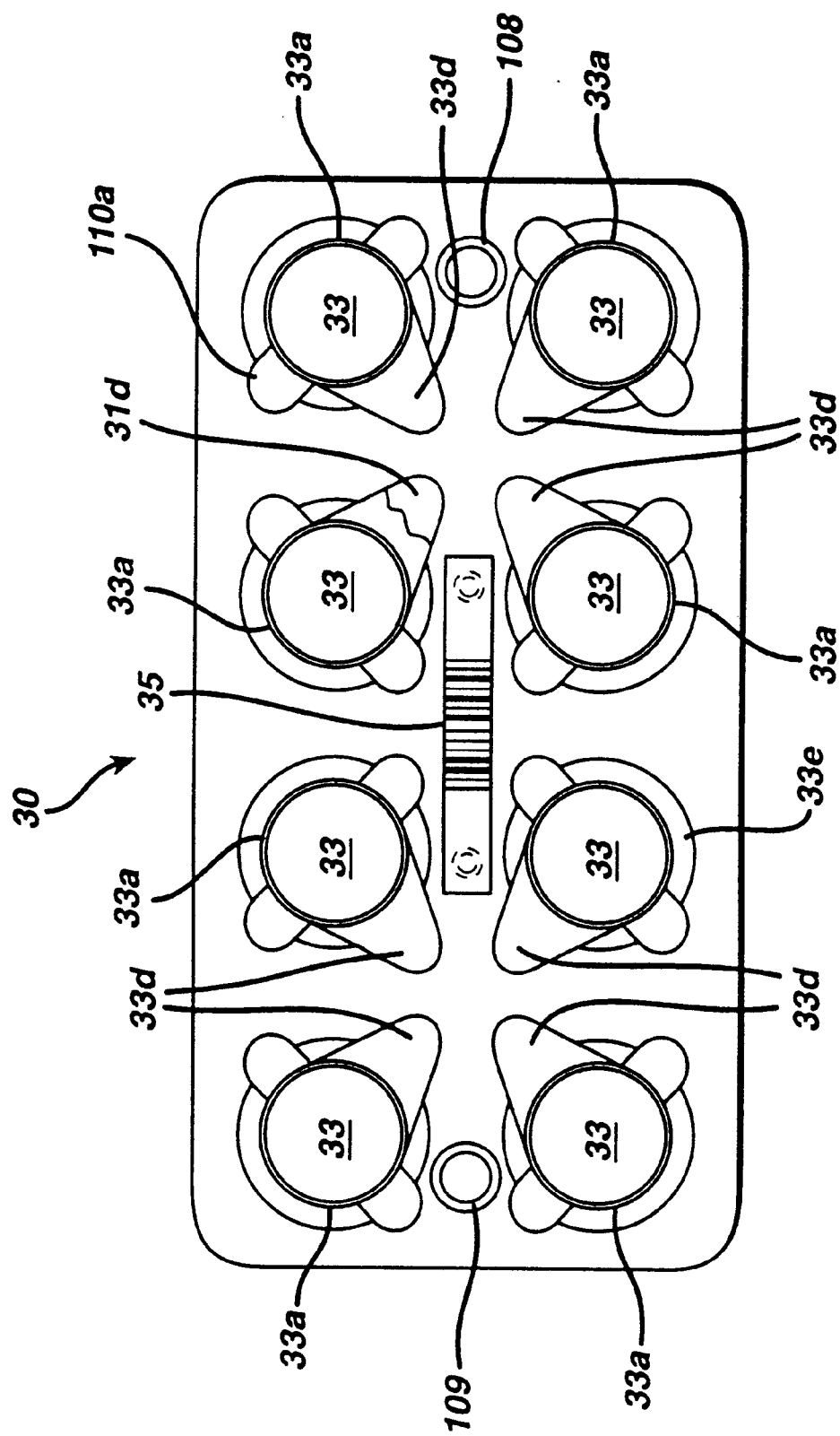

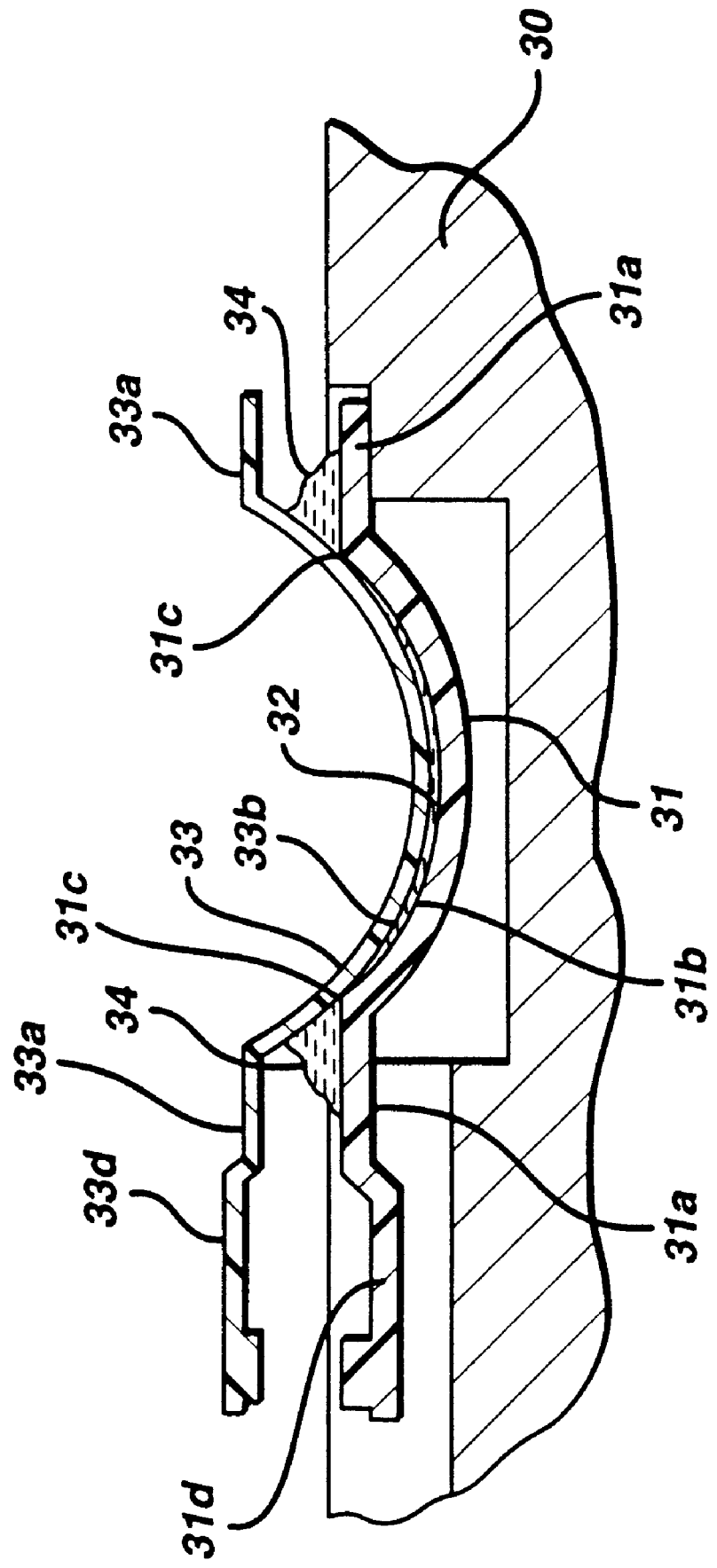

ROTATIONAL INDEXING BASE CURVE DEPOSITION ARRAY

BACKGROUND OF THE INVENTION

1. Field of the Invention

The present invention relates generally to a rotational indexing base curve deposition array for molding contact lenses, and more particularly pertains to a toric indexing base curve deposition array for assembling toric base curves and front curves with a prescribed and programmable angular orientation therebetween in a one step operation. The present invention allows a single type of base curve mold to be selectively rotated to a plurality of different angular positions relative to a front curve mold to produce different toric contact lenses having the toric curve axis positioned at a plurality of different angular positions. Although the specific embodiment discussed herein relates to toric contact lenses, the present invention has broader applicability and can be utilized for any lenses wherein the two optical surfaces require different rotational orientations, such as for some aspheric contact lenses, or wherein an inversion mark is desired on a particular angular location on the lens.

2. Discussion of the Prior Art

It is known that for astigmatic subjects, the astigmatic eye forms an image which contains three main regions:

1. The spherical power focuses as a line;
2. The cylindrical power also focuses as a line, perpendicular to the spherical image line;
3. In between the two, a circular image is formed, known as the "circle of least confusion".

Toric contact lenses are normally prescribed for astigmatic patients with either corneal or lenticular astigmatism, and have a cylindrical optical surface/power which is used to correct for astigmatism in a wearer. Statistically, astigmatism usually occurs in people primarily around either the horizontal axis or the vertical axis, but also at varying axial locations with respect thereto. In the prior art a separate type of toric contact lens is required for each different toric optical power and also for each different orientation of the toric cylindrical axis of the contact lens, which are required to accommodate different patients with differing amounts of astigmatism along different axes.

Accordingly, an inventory of toric contact lenses, or plastic molding parts for molding the toric contact lenses, includes a large number of different combinations of toric axis locations and toric optical powers.

In conventional prior art toric lens designs, a single toric surface comprising a major and minor axis is placed in the optical portion of either the front or the base curve surface, usually the base curve surface. In addition, the axes of the toric lens are usually stabilized in relation to the patient's corneal axes through the use of either a prism ballasted/slab-off feature or a double slab-off feature placed on the front surface of the lens.

Currently, toric lenses are manufactured in the prior art with the following design features:

a. a toric curve on the front or base surface of the lens;
b. prism ballast and slab-off features on the front surface of the lens;
c. the non-toric surface is spherical.

These prior art lens designs correct astigmatism adequately only if the axis of the cylindrical power is accurately aligned with respect to the axis of the astigmatic cornea. A misalignment of the axes (greater than 10°) results in a substantial loss of visual acuity.

Conventional toric lens designs require a large number of stock keeping units (SKUs) in inventory (the total number of the different prescriptions which are maintained in stock and can be prescribed) in order to fit a broad astigmatic patient base. For example, current Frequent Replacement Toric lens products are available in 800 stock keeping units per base curve in inventory (40 spherical powers×2 cylindrical powers×10 different cylindrical axis placements). Such a large number of stock keeping units per base curve in inventory is uneconomical to produce and maintain, particularly for a disposable modality product. The required large number of stock keeping units in inventory arises primarily from the need to provide 10 or more different cylindrical axis placements. Furthermore, any significant misalignment of the cylindrical axis with respect to the axes of the eye normally results in a significant loss of visual acuity, and accordingly accurate alignment of the cylindrical axis is a primary requirement of such lenses.

SUMMARY OF THE INVENTION

Accordingly, it is primary object of the present invention to provide a rotational indexing base curve deposition array for molding lenses such as contact lenses or intraocular lenses.

A further object of the subject invention is the provision of a toric indexing base curve deposition array for assembling toric base curves and front curves with a prescribed and programmable angular orientation therebetween in a one step assembly operation. The present invention allows a single type of base curve mold to be selectively rotated to a plurality of different angular positions relative to a front curve mold to produce different toric contact lenses having the toric curve axis positioned at a plurality of different angular positions.

In accordance with the teachings herein, the present invention provides a method and apparatus for producing a molded lens having a first optical surface, and a second optical surface which is precisely angularly indexed to a precise angular position relative to the first optical surface. A plurality of front curve molds are arranged in a regular array, and a dosed amount of monomer mixture is deposited into each of the front curve molds. A plurality of base curve molds are also arranged in a regular array. An array of deposition tubes, positioned in a support plate and coupled to a vacuum source, is used to pick up and support the array of base curve molds. Each of the deposition tubes is then angularly rotated relative to the support plate to a selected angularly indexed position therein. The angularly indexed array of base curve molds is then assembled over the array of front curve molds with the dosed amounts of monomer therebetween. The arrangement is such that each base curve mold is in a precisely angularly indexed position relative to a front curve mold to produce a lens having first and second optical surfaces which are precisely angularly indexed relative to each other.

In greater detail, the plurality of front curve molds are arranged in a regular array in a front curve mold support pallet, and the plurality of base curve molds are arranged in a regular array in a base curve mold support pallet. A pallet delivery system alternates delivery of the base curve mold support pallets with the front curve mold support pallets. The support plate and array of deposition tubes are vertically reciprocated between raised and lowered positions. In the lowered position, the array of deposition tubes is placed above the array of base curve molds, and each deposition tube picks up and supports a base curve mold by a vacuum.

Each deposition tube is angularly rotatably mounted in the support plate, and a common angular rotational drive is coupled to each of the deposition tubes in the array to angular index it to a precise angular position in the support plate. The common angular rotational drive is driven by a stepper motor which can be controlled in a programmable manner to change the selected angular indexed position. The stepper motor drives moveable racks, which drive pinion gears mounted around the deposition tubes. The regular array includes a 2×4 array, and each moveable rack drives a 1×4 array of deposition tubes, each of which is driven by a pinion gear positioned therearound. Each base curve mold defines a toric surface, the angular position of which is precisely angularly indexed relative to a front curve mold to form a mold for a toric contact lens having a selected cylindrical axis placement therein.

BRIEF DESCRIPTION OF THE DRAWINGS

The foregoing objects and advantages of the present invention for a rotational indexing base curve deposition array may be more readily understood by one skilled in the art with reference being had to the following detailed description of several preferred embodiments thereof, taken in conjunction with the accompanying drawings wherein like elements are designated by identical reference numerals throughout the several views, and in which:

FIGS. 1(a)–1(d) are diagrammatic and illustrated flow diagrams of a method of filling and assembling molds to produce contact lenses;

FIG. 1(e) represents a block diagram flow chart of the method of filling and assembling molds to produce contact lenses;

FIG. 2 is a top plan view of a carrier pallet used to transport a plurality of contact lens molds to and from a filling and assembly station;

FIG. 3 is a cross-sectional view of an assembled mold as carried in the carrier illustrated in FIG. 2;

DETAILED DESCRIPTION OF THE DRAWINGS

Figure 4:
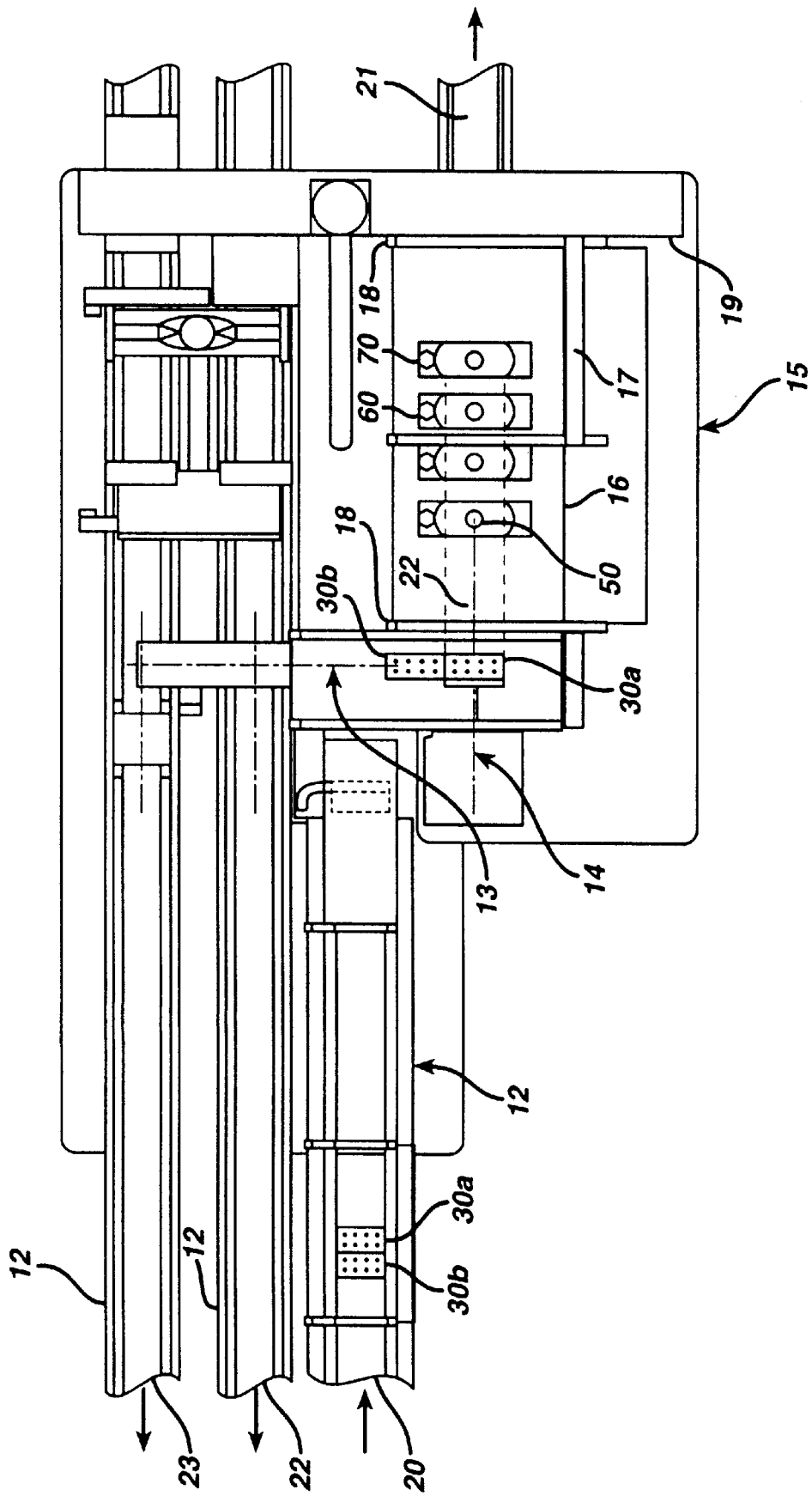
FIG. 4 is a diagrammatic top plan view of a filling and assembly station.

The rotational indexing base curve deposition array of the present invention is designed to operate in a mold filling and mold assembly environment as described in detail in U.S. patent application Ser. No. 08/431,635, now U.S. Pat. No. 5,658,602, for Method and Apparatus For Contact Lens Mold Filling and Assembly, the entire disclosure of which is hereby expressly incorporated by reference herein.

The following explanation, with reference to FIGS. 1–5, is in the context of the explanation of U.S. patent application Ser. No. 08/431,635, now U.S. Pat. No. 5,658,602, and is offered to explain the field of technology and general background of the present invention.

The present invention is useful in a process for forming soft contact lenses from a polymerizable monomer or monomer mixture. The soft contact lenses are formed in a mold assembly comprising a first front curve mold half 31 and a second base curve mold half 33, which can be assembled into one mold as illustrated in FIG. 3. The mold halves are preferably formed of polystyrene which is transparent to visible and ultraviolet light. A central curved section of the front curve mold 31 defines a concave surface 31b, and a central curved section of the base curve 33 defines a convex surface 33b. The front mold curve 31 also defines a circular circumferential knife edge 31(c), and an annular essentially uniplanar flange 31(a) integral with the circumferential knife edge. The base mold curve also defines an essentially uniplanar flange 33(a). Each of the mold halves 31 and 33 has a projecting tab, respectively 31(d), 33(d), which projects radially beyond the flange 31(a), 33(a), and which serves to angularly align each mold half in a support pallet, as illustrated in FIG. 2.

At least a part of the concave surface 31b and the convex surface 33b have the somewhat diminished dimensions of the front or base curves, respectively of a contact lens to be produced in the mold assembly, and are sufficiently smooth such that the surface of a contact lens formed by polymerization of a polymerizable composition in contact with the mold surface is optically acceptable. The mold is sufficiently thin to transmit heat rapidly therethrough, and has sufficient rigidity to withstand prying forces applied to separate the mold halves during demolding.

The monomer can be degassed prior to pumping, as more particularly described in U.S. patent application. Ser. No. 08/212,624, filed Mar. 11, 1994, entitled Method and Apparatus for Making an Ophthalmic Lens, now U.S. Pat. No. 5,435,943, assigned to the assignee of the present invention. This process removes part of the dissolved gasses present in the monomer mixture prior to the pumping of the monomer to the deposition or filling station. Discharge of the monomer from the supply nozzle into the front curve mold half can optionally be done under vacuum to ensure that no gasses are trapped between the monomer and the front lens mold as the monomer is deposited.

The complementary pair of first 31 and second 33 mold halves which define the shape of the final desired contact lens are used to directly mold the monomer mixture wherein the mixture is dissolved in a nonaqueous water displacable solvent as described in U.S. Pat. Nos. 4,680,336, 4,889,664 and 5,039,459. After the deposition or dosing step, in which the front concave mold half 31 is substantially filled with a polymerization mixture 32, the concave front mold half 31 is covered with a base mold half 33 under a vacuum to ensure that no air bubbles are trapped between the mold halves.

The first and second mold halves may then be clamped together in an assembly step to displace any surplus monomer from the mold area and to properly align the mold halves by alignment of the mold flanges.

Following the mold assembly and clamping steps, the first and second mold halves are then clamped together a second time in a precure step wherein the polymerization mixture is exposed to actinic light, preferably from a UV lamp, while the mold halves are clamped. Typically, the mold halves are clamped for approximately 40 seconds with 30 seconds of actinic radiation. This irradiation with actinic visible or ultraviolet radiation produces a polymer/solvent mixture in the shape of the final desired hydrogel lens. At the completion of the precure step, the polymerization mixture has formed a partially polymerized gel, with polymerization initiated throughout the mixture.

Following the precure step, the monomer/solvent mixture is then cured in a UV oven whereby polymerization is completed in the monomer(s).

After the polymerization process is completed, the two halves of the mold are separated in a demolding step leaving the contact lens in the first or front curve mold half, from which it is subsequently removed. The front and base curve mold halves are typically used for a single molding operation and are then disposed of or discarded.

After the demolding step, the solvent is displaced with water to produce a hydrated lens which when fully hydrated and buffered is in the final shape and size of the lens. In most cases, this is nominally 10% larger than the original molded polymer/solvent article.

Polymerization of the polymerizable composition in the mold assembly is preferably carried out by exposing the composition to polymerization initiating conditions. The preferred technique is to include in the composition initiators which work upon exposure to ultraviolet or visible radiation; and exposing the composition to ultraviolet or visible radiation of an intensity and duration effective to initiate polymerization and to allow it to proceed. For this reason, the mold halves are preferably transparent to ultraviolet or visible radiation. After the precure step, the monomer is again exposed to ultraviolet or visible radiation in a cure step in which the polymerization is permitted to proceed to completion. The required duration of the remainder of the reaction can readily be ascertained experimentally for any polymerizable composition.

After the polymerizable composition has polymerized, the mold assembly is disassembled to permit further processing of the polymerized product into a contact lens (such processing including e.g. washing and hydrating, packaging and sterilizing of the lens). Preferably, the flanges of the front and base mold halves are gripped and pulled away from each other, either in directly opposite directions or through an angle in a prying motion. Advantageously, the assembly is first heated moderately to facilitate separation of the polymerized article from the mold half surfaces.

FIG. 1(e) is a block diagram flow chart of the method of operation and FIGS. 1(a)–(d) are diagrammatic illustrations of the method of operation. As illustrated in FIG. 1(a), specialized carriers or pallets 30 are fed to the deposition and assembly stations carrying, on alternate pallets, front curve mold halves and base or base curve mold halves. FIG. 2 illustrates a front curve mold support pallet carrying a 2×4 array of assembled front and base curve molds as shown in FIG. 3. As will be more fully described with respect to FIG. 4, the pallets arrive at a filling and assembly station in alternating sequence with the pallet containing base curve halves first in sequence, followed immediately thereafter by a pallet loaded with front curve mold halves, and etc. These pallets are conveyed into the filling and mold assembly station sequentially at the rate of approximately 1 pallet each 6 seconds.

As illustrated in FIG. 1(a), a predetermined amount of the polymerizable hydrogel or monomer 10 is deposited in a front curve mold half by means of a precision dosing nozzle 142, which is part of the dosing or filling station 50. The monomer may be dosed under vacuum in each of the front curve mold halves, carried in the alternating pallets, to avoid the possibility of entrapping any gasses between the monomer and the front curve mold half 31. Further, the polymerizable monomer mixture may be degassed to ensure that significant dissolved gasses are not present in the monomer inasmuch as dissolved gasses may well form bubbles as the monomer is exposed to vacuum conditions.

In a preferred embodiment, approximately 60 $\mu$l of polymerizable hydrogel or monomer is deposited in each front curve mold half to ensure that the mold cavity is overdosed, in order to avoid the possibility of incomplete molding. The excess monomer is removed from the mold cavity in the final step of the assembly of the front and base curve mold halves, as will be hereinafter described.

The second station in the apparatus for depositing and assembling the mold parts is a stamping station which is illustrated schematically in FIG. 1(b), and described more fully in U.S. patent application Ser. No. 08/258,263, filed Jun. 10, 1994, entitled Method and Apparatus For Applying a Surfactant to Mold Surfaces, now U.S. Pat. No. 5,542,978 also assigned to the assignee of the present invention. As illustrated in FIG. 1(b), the annular flange 31(a) surrounding the front curve mold half is stamped via stamp pad 21 with a thin film of surfactant which has been found to be useful in removing the excess monomer displaced from the mold cavity at the time of assembly. The excess monomer (when hydroxyethylmethacrylate is used, it is referred to as "HEMA") is displaced between the flanges 31(a) and 33(a), as illustrated in FIG. 1(d) to form a ring 34 of excess HEMA at the time of mold assembly, as shown in FIG. 3. This HEMA ring is also cured contemporaneously with the polymerizable hydrogel that forms the contact lens 32.

By stamping the front curve mold flange 31(a) with a mold release surfactant, the HEMA ring 34 preferentially adheres to the base curve mold half flange 33(a) and is removed from the production line at the time the base curve mold half is removed at mold disassembly. In one preferred embodiment, the mold release surfactant is a polyethylene oxide sorbitan mono-oleate, commercially sold under the tradename "Tween 80".

The stamping head station 60 mounts therein a plurality of stamps 21, each of which is adapted to be moved in a vertical reciprocatory movement in a coordinated manner by pistons 22 mounted in the stamping head station 60, wherein the number of stamps 21 is correlated with the number of front curves 31 carried by the mold pallet 30.

A horizontally shiftable pad member (not shown) is adapted to be positioned in spaced relationship below the lower end of each stamp 21 when the stamp is in a raised position, and is constituted of a suitable porous material, such as porous polyethylene having an average 10 micron pore size, which is impregnated with a solution containing a surfactant, the latter of which may be present in a highly concentrated state. The upper surface of the pad member is covered by a filter, preferably of nylon, having a mesh size of 1.2 microns so as to act as a metering device and allow only a relatively small quantity of surfactant to pass therethrough as the surfactant is wicked from the bottom of the pad member to the top when the pad member is pressingly contacted by the bottom ends of the stamping heads 21.

The method of operation of the assembly station will be described hereinafter with respect to FIGS. 1(c), 1(d), 4 and 5. As pallets 30 containing the base curve mold halves 33, which are first in the alternating sequence, enter the assembly station illustrated in FIG. 4, a plurality of reciprocating vacuum grip pistons or deposition tubes 71 are reciprocated downwardly, to pick up the base curve mold halves from the first of the alternating pallets 30. The base curve mold halves are lifted by means of a vacuum drawn in chamber 71(a), which secures each base curve mold half to a reciprocating piston or deposition tube 71. After the base curve pick up, the empty base curve pallet 30 is advanced, and a second pallet containing the front curve mold halves and monomer is advanced under the reciprocating piston, as illustrated in FIG. 1(d). A vacuum is then drawn around the entire assembly to ensure that no gasses are trapped between the mold halves and the monomer at the time the mold is assembled.

Figure 6:
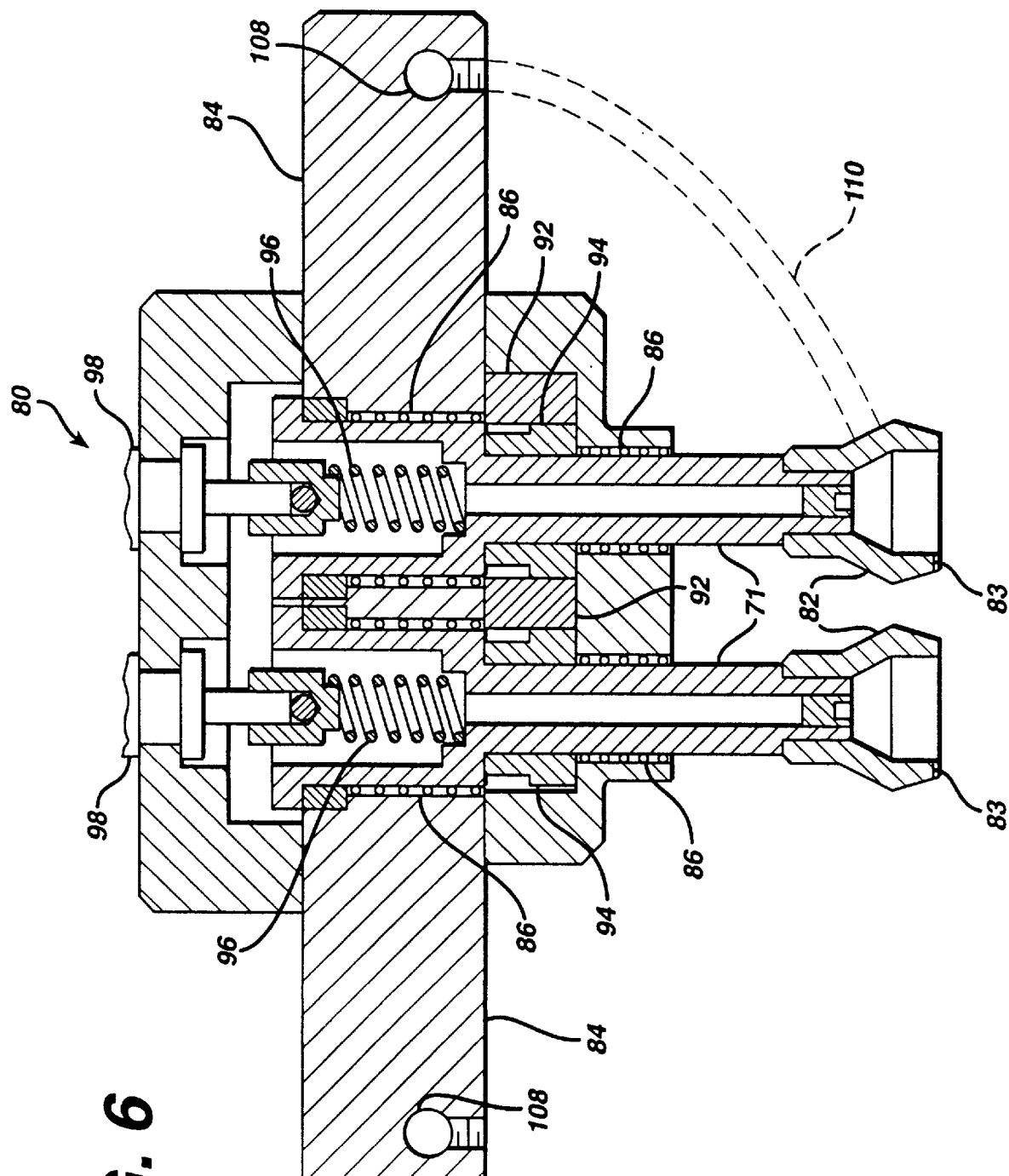
FIG. 6 is a sectional view of a toric indexing base curve deposition array pursuant to the teachings of the present invention, and illustrates a rack and pinion positioning mechanism for precisely controlling the angular index position of each deposition tube therein.
Figure 7:
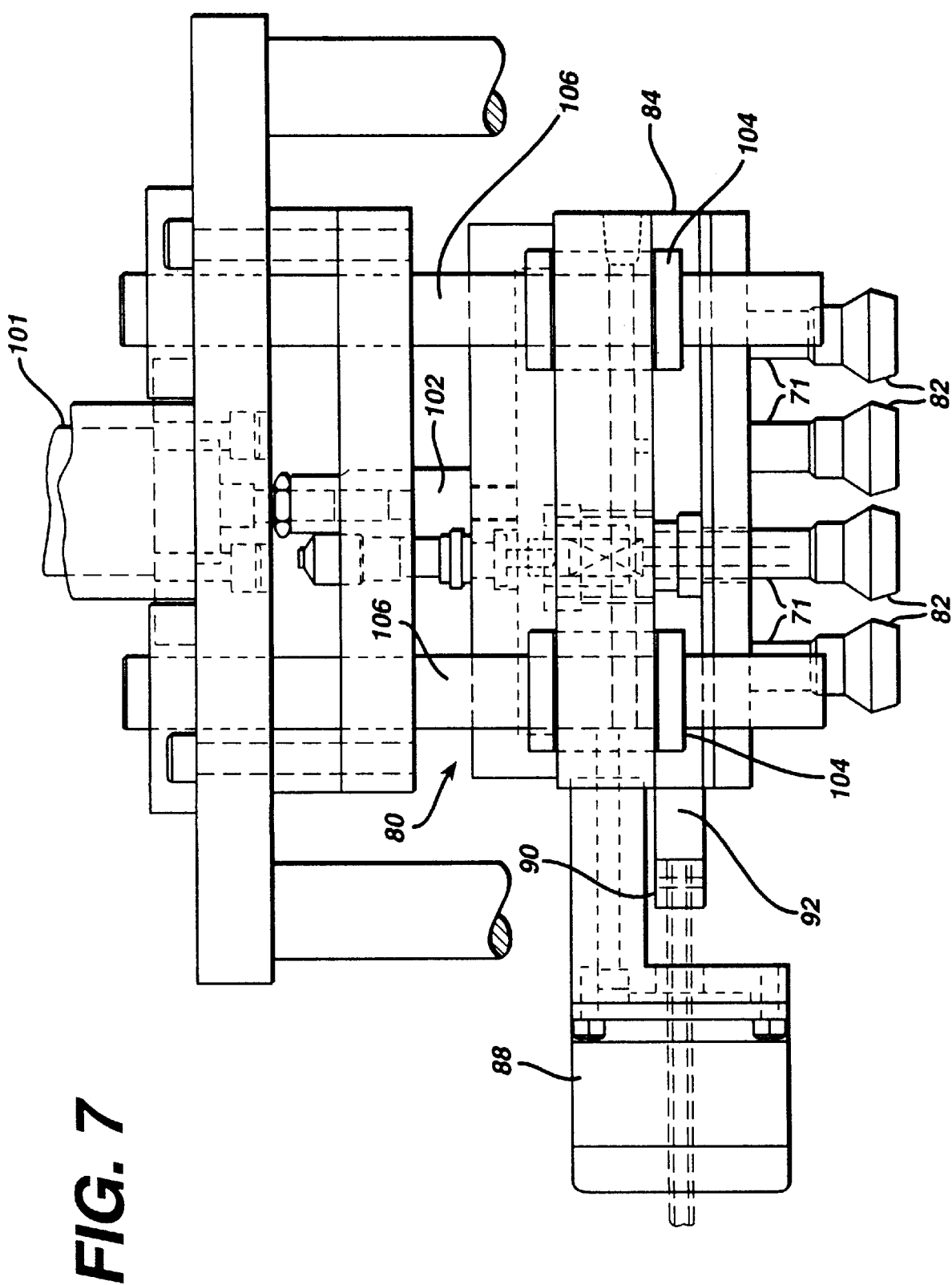
FIG. 7 is a side elevational view of the toric indexing base curve deposition array shown in FIG. 6, and illustrates one 1×4 row of deposition tubes of a 2×4 array of deposition tubes, and how the angular index position of each deposition tube in that row is controlled in common by the rack and pinion drive.
Figure 8:
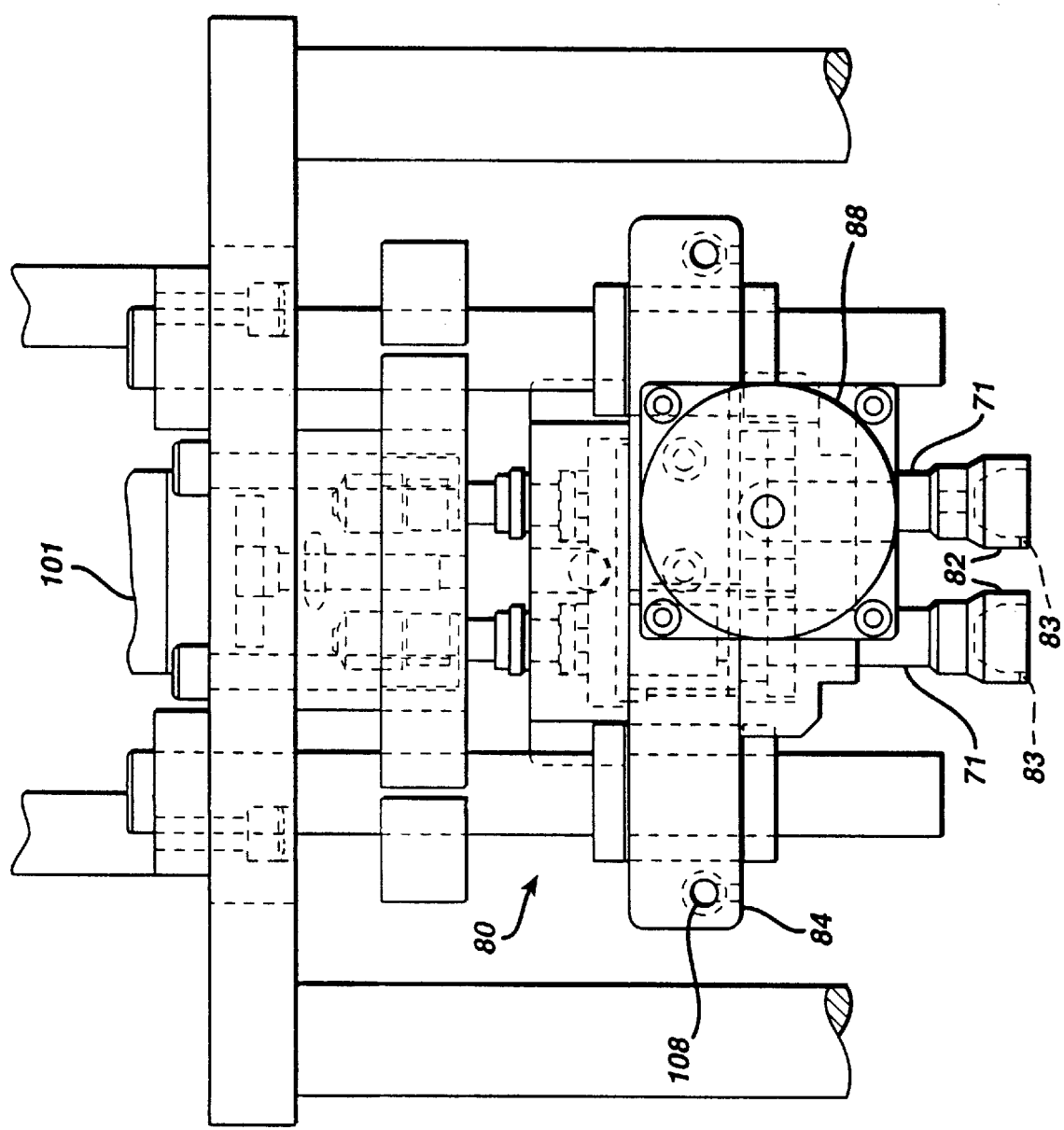
FIG. 8 is a front elevational view of the toric indexing base curve deposition array shown in FIGS. 6 and 7.

After the base curve pick up, the toric indexing base curve deposition array of the present invention, as illustrated in FIG. 6–8, is utilized to index each of the deposition tubes to a precise angular orientation of the axis of the cylindrical or toric surface of the base mold curve.

The reciprocating piston 70 is then driven downwardly so that the base curve mold half 33 contacts the monomer and displaces it throughout the mold cavity. As the reciprocating piston 71 continues to descend downwardly, the excess monomer overflows the cavity. Optionally, the reciprocating action of the piston may descend far enough to seat the flat annular surface 33(a) of base curve mold half 33 against the circumferential parting knife edge 31(c) of the front curve mold half, thereby aligning the mold parts and displacing the excess monomer into the space between the flanges 31(a), 33(a) in which forms the excess HEMA ring 34 is formed. The base curve mold half may then be clamped to the front curve mold half by a floating over travel mechanism. After a predetermined period, the vacuum in chamber 71(a) is broken, but the clamping pressure from piston 71 is retained during overtravel of the assembly module. Then the vacuum surrounding the assembled mold halves and reciprocating piston 71 is broken, and reciprocating piston 71 is retracted, thereby allowing pallet 30 to be transferred out of the assembly station to the precure station.

Figure 5:
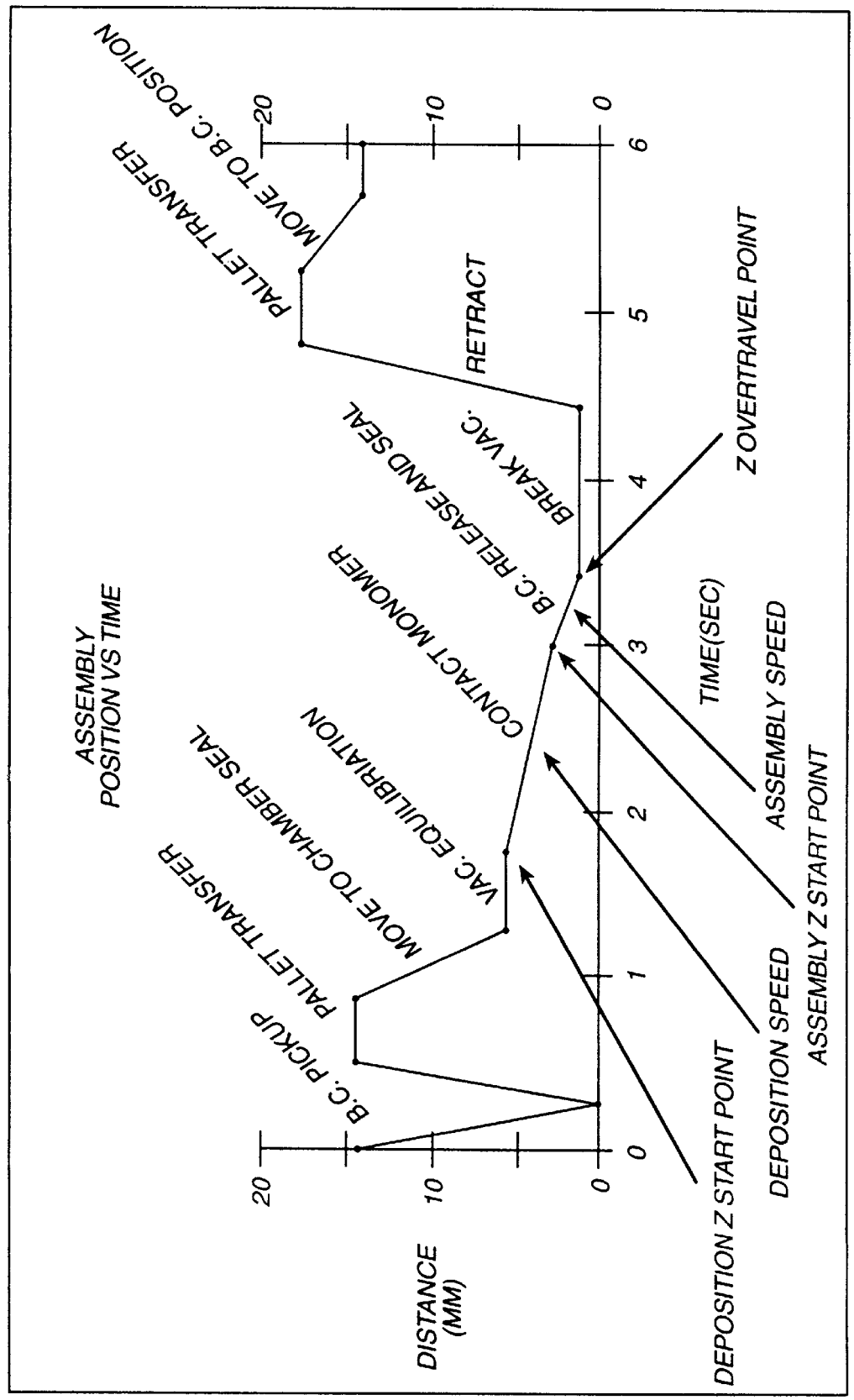
FIG. 5 is a diagrammatic time line illustration of the assembly steps of one exemplary embodiment of a mold filling and assembly station.

The assembly of the mold halves according to one disclosed exemplary embodiment is described in the time sequence chart illustrated in FIG. 5 in which the position of a reciprocating piston or deposition tube 71 is plotted as a function of time.

As illustrated in FIG. 7, at the zero start point, the reciprocating piston 71 begins to descend for the base curve pick up, and reaches and secures the base curve in approximately 0.25 seconds. The piston 70 is then reciprocated upwardly to its upper position 14 mm above pallet 30 in approximately 0.25 seconds.

After the base curve pick up, the toric indexing base curve deposition array 80, FIG. 6–8, of the present invention is utilized to index each of the deposition tubes to a precise angular orientation of the axis of the cylindrical or toric surface of the base mold curve.

The pallets are then advanced whereby the base curve mold half pallet is removed and the front curve mold half pallet is inserted, which transfer takes approximately 0.5 seconds. While the pallets are being transferred, a vacuum chamber begins its descent towards the front curve mold pallet 30 and contacts the mold pallet to establish a seal between the chamber and the pallet, A seal is established at approximately 1.25 seconds after the zero point, and the nitrogen in the chamber is then evacuated until a vacuum equilibrium is reached at approximately 1.75 seconds.

It should be noted that the reciprocating piston or deposition tube 71 is carried within the vacuum chamber so that as the vacuum chamber descends and seals to the pallet, the reciprocating piston 71 and the base curve mold half 33 have been partially lowered to approximately 5 mm above the front curve mold half. At 1.75 seconds, the reciprocating piston 71 begins independent downward travel and contacts the monomer at approximately 2.5 seconds after the zero point. Downward travel of the reciprocating piston continues and at approximately 3 seconds, the base curve mold half is firmly seated on the parting edge 31(c) of the front curve mold half indicating formal assembly. Shortly thereafter, the vacuum in chamber 71(a) is broken, but the reciprocating piston 71 maintains a downward force on the base curve mold half while the remainder of the assembly module continues a downward travel to establish an independent floating clamping of the base curve mold halve against a front curve. At approximately 3.4 seconds, the vacuum is broken in the vacuum chamber, and at approximately 4.4 seconds the reciprocating piston 71, the vacuum chamber and the assembly module begin to retract. At 4.75 seconds, the pallet containing the assembled mold halves is transferred out of the assembly station, and a new pallet containing base curve mold halves is inserted under the mold assembly module. At approximately 5 seconds, the reciprocating piston 71 is then moved to its base curve pick up position, and at 6 seconds, the assembly begins anew at the zero start point.

The mold filling and assembly arrangement is illustrated in plan view in FIG. 4 in which a conveyor 20 provides a sequenced supply of alternating pallets, two of which are schematically illustrated in FIG. 4 as 30(a) and 30(b). In an exemplary embodiment, pallet 30(a) contains 8 base curve mold parts in a 2×4 array and pallet 30(b) contains 8 front curve mold parts in a 2×4 array. These pallets travel on conveyor 20 in a nitrogen tunnel 12 which surrounds each of the conveyors and material handling devices to provide a low oxygen environment for all of the component parts prior to polymerization. Material handling pallet pushers 13 and 14 direct the pallets from conveyor belt 20 to the filling and assembly station 15, which is also enclosed within a nitrogen enclosure 16. Enclosure 16 may be pivoted up and out of the way for servicing via means of handle 17 and hinges 18.

Within the filling and assembly station 15, there are provided a filling or dosing assembly 50 for filling the front curves with a predetermined precision dose of monomer, an apparatus 60 for applying a mold release surfactant to the flange area of the front curve molds, and a mold assembly station 70. Following assembly, the empty base curve mold pallets are returned by a material handling pusher 19 to the base curve pallet return conveyor 22, while the filled and assembled mold assemblies are conveyed in their respective pallet via conveyor 21 to the precure station.

The material handling apparatus 14 is a precision device which pushes the pallets one at a time onto track 22 to be processed by the various stations in the deposition and assembly apparatus. The pallets are advanced serially, with each advance stroke being the width of the pallet ±0.1 mm. This enables placement of the pallets for precision registration in the various modules of the filling and assembly station 15.

The detailed description of the invention to this point has entailed a description of known apparatus and procedures to enable an appreciation of the present invention which is illustrated in FIGS. 6, 7 and 8. FIG. 6 is a sectional view of a toric indexing base curve deposition array 80 pursuant to the present invention, and illustrates a rack and pinion positioning mechanism for precisely controlling the angular index position of each deposition tube therein. FIGS. 7 and 8 are respectfully side and front elevational views of the toric indexing base curve deposition array 80 shown in FIG. 6.

The toric indexing base curve deposition array 80 includes a 2×4 array of deposition tubes 71, positioned in a support plate 84 and coupled to a vacuum source, which are used to pick up and support the array of base curve molds 33. The support plate 84 and array of deposition tubes 71 is positioned above the array of base curve molds 33, and each deposition tube picks up and supports a base curve mold by a vacuum. Each deposition tube 71 preferably includes a base curve contact head 82 having an alignment notch 83 therein which self aligns with a corresponding projection on the base curve mold to ensure a self-aligning fit therebetween. Each of the deposition tubes 82 is then angularly rotated relative to the support plate in a bearing 86 to a selected angularly indexed position therein. The angularly indexed array of base curve mold is then assembled over the array of front molds with the dosed amounts of monomer therebetween.

A common angular rotational drive is coupled to each of the deposition tubes in the array to angular index each of the deposition tubes to precise angular position in the support plate. The common angular rotational drive is driven by a stepper motor 88 which can be controlled in a programmable manner to change the selected angular indexed position. The stepper motor drives a T bar 90 which drives two moveable racks 92, and each of the deposition tubes 71 includes a pinion gear 94 therearound which is driven by a rack. The regular array includes a 2×4 array, and each moveable rack 92 drives a 1×4 array of deposition tubes 71, each of which is driven by a pinion gear 94 positioned therearound. Each base curve mold 33 defines a toric surface, the angular position of which is precisely angularly indexed relative to a front curve mold 31 to form a mold assembly, FIG. 3, for a toric contact lens having a selected cylindrical axis placement therein.

The present invention differs from a normal prior art molding operation in that the toric base molds curve molds 33 are indexed or rotated from the neutral position molded on the base curve frame to a prescribed angle before force controlled assembly of the front and base curve molds by the same fixture. The toric indexing base curve deposition array 80 indexes the base curve mold 33 to a precise angular position, and then assembles it to the front curve mold 31 in one step. By altering the stepper motor 88 commands, the precise angle of base curve rotation can be easily adjusted. The velocity and force with which the base curve and front curve are assembled can also be easily adjusted. In one embodiment, the force of the base curve to front curve assembly is developed by deflecting spring loaded deposition tubes.

Referring to FIGS. 6–8, the toric indexing base curve deposition array 80 comprises a 2×4 array of deposition units, each of which includes a deposition tube 71, a compression spring 96, and micrometer type spring preload adjuster 98. The toric indexing base curve deposition array 80 also includes a deposition array support plate 84, a T bar drive 90 connecting two drive racks 92, tube pinions 94, stepper motor and screw 88 connected to the T bar drive 90.

The toric indexing base curve disposition array operates as follows.

Step 1

The device 80 is lowered into a base curve cut fixture (or a base curve support pallet) by a stepper motor 101 drive coupling 102, guided by shaft bearings 104 and vertical shafts 106.

Step 2

Before the base curves are cut, a vacuum source is energized which travels through the array plate vacuum manifold 108 and then through the flexible tubing 110 to the deposition tube 71 end where the base curve is located. The device 80 is then retracted upwardly with the base curves attached to the deposition tubes.

Step 3

After the device 80 is retracted to the upward position, the deposition tubes 71 are rotated and indexed to a preprogrammed angle by movement of the stepper motor and screw 88 via the T bar drive 90, drive racks 92, and the tube pinions 94.

Step 4

The device 80 is then lowered in a controlled manner by the stepper motor 101 and drive 102 onto the dosed front curve fixture. After physical contact is made with the knife edge 31(*c*) of the front curve, the stepper motor 101 and drive 102 accelerates the base curve to a higher velocity further into the cavity until the amount of overtravel on the array plate has caused the desired assembly force to be developed by the compression spring 96. The vacuum is de-energized in a timed operation just before the base curve contacts the knife edge of the front curve. Free rotational movement of the deposition tubes 71 in the support plate 84 is aided by coated tube bearings 86. The stop point of this process is determined by the relative position of the array support plate 84 which is driven by the stepper motor 101 and drive 102. The assembly force of the base curve to the front curve knife edge is determined by two machine settings. First, the micrometer type spring preload adjusters 98 determine the force required to begin relative movement between the deposition tube and the array plate as well as causing an arithmetic change in the force for a given overtravel. Secondly, the amount of overtravel programmed in the stepper motor drive determines the final assembly or seating force value.

Step 5

The array 80 is retracted to its upward position. Once there, the deposition tubes 71 are indexed base to their original or home positions by movement of the stepper motor and screw 88 via the T bar 90, drive racks 92, and the tube pinions 94. The operation then recycles with step 1.

The toric base curve deposition array 80 has several unique features. Use of the deposition array 80 in a filling/assembly machine with the previously discussed sequence of operations will assemble toric base curves and front curves with a prescribed angular orientation with one step. The current assembly device cannot rotate base curve molds at any point.

One current assembly or deposition is a two step process in which the base curve mold is dropped onto the dosed cavity and moved to another complete station to be assembled further by a system of free weights. The current two step process does not result in making precision toric lenses in that once the base curve is left to float on the dosed cavity before free weighting, it is free to change its angular position. This is not compatible with the required angular precision of a molded toric contact lens. Thus, the present invention allows for the precision assembly of toric lens molds at any clinically desirable angle using presently available soft lens molding technology and machinery. The spring loaded base curve deposition array is fully integrated into the present invention, thereby allowing one step assembly or deposition combined with toric base curve indexing.

In a preferred alternative embodiment, each compression spring 96 and micrometer spring preload adjustor 98 can be replaced by a pneumatic piston and cylinder drive element.

The rotational indexing base curve deposition array 80 of the present invention can be used in a vacuum mold filling environment as disclosed in U.S. patent application Ser. No. 08/431,635, now U.S. Pat. No. 5,658,602, for a Method and Apparatus For Contact Lens Mold Filling and Assembly, filed May 1, 1995. Alternatively, the toric indexing base curve deposition array can be used in an atmospheric (nonvacuum) mold filling environment.

The present invention preferably uses a one-step contact lens mold filling arrangement as disclosed in U.S. patent application Ser. No. 08/431,635, now U.S. Pat. No. 5,658,602, as opposed to a prior art molding arrangement wherein the base curve is placed on a pool of monomer deposited in a front curve, and is somewhat free to rotate prior to a fixed securement of the base curve to the front curve, as disclosed for instance in Larsen U.S. Pat. No. 4,564,348.

The disclosed embodiment rotates the contact lens base curve molds (which generally define the toric surface) relative to the contact lens front curve molds. However, the relative angular rotation achieved by the present invention could also be accomplished by rotation of the contact lens front curves relative to the contact lens base curves. Alternatively the toric surfaces could be place in the front curves, although the base curves are preferred. Moreover, the rack and pinion gear drives can be replaced by alternative drives, such as by a drive using a timing belt or by a direct drive motor on each deposition tube.

In the mold filling arrangement of U.S. patent application Ser. No. 08/431,635, now U.S. Pat. No. 5,658,602 after securing the base curves to the front curves, the assembled molds are moved or indexed to another work station for curing of the monomer resin by exposure to actinic ultraviolet radiation. However, the present invention could also be used in molding station arrangements wherein the monomer resin is cured by exposure to actinic radiation in the work station in which the front and base curves are assembled.

The present invention can implement "on the fly" changes in the position of the toric axis on the contact lens, as such changes merely involve programming the stepper motor 88 to rotate the base curves to a different angular position for the next molding sequence.

One disclosed embodiment uses an arrangement wherein a 2×4 array of interconnected base curves, interconnected by runners, are placed on a base curve cut fixture which severs (die cuts) the runners to produce a 2×4 array of individual unconnected base curves, each of which is rotated to a selected angular position by the toric indexing base curve deposition array of the present invention. However the present invention can also be used in molding arrangements wherein an array of individual base curves is supported in a molding pallet having an array of support cavities, each of which supports and positions a base curve.

While several embodiments and variations of the present invention for a rotational indexing base curve deposition array are described in detail herein, it should be apparent that the disclosure and teachings of the present invention will suggest many alternative designs to those skilled in the art.

What is claimed is:

1. An automated method for producing a plurality of molded lenses, each lens having a first optical surface and a second optical surface which is precisely angularly indexed to a precise angular position relative to the first optical surface comprising:
    a. arranging a plurality of front curve molds in a regular array at a first station;
    b. arranging a plurality of base curve molds in a regular array at the first station;
    c. transporting the front curve and base curve molds to a second station for production of the plurality of lenses;
    d. depositing a dosed amount of monomer mixture into each of the plurality of front curve molds at the second station;
    e. utilizing an array of deposition tubes at the second station, positioned in a support plate and coupled to a vacuum source, to pick up and support the array of base curve molds;
    f. angularly rotating each of the deposition tubes relative to the support plate to a selected angularly indexed position therein; and
    g. placing the angularly indexed array of base curve molds over the array of front curve molds with the dosed amount of monomer therebetween, such that each base curve mold is in a precisely angularly indexed position relative to a front curve mold to produce the plurality of lenses, each lens having first and second optical surfaces which are precisely angularly indexed relative to each other.

2. A method as claimed in claim 1, wherein the plurality of front curve molds are arranged in a regular array in a front curve mold support pallet.

3. A method as claimed in claim 2, wherein the plurality of base curve molds are arranged in a regular array in a base curve mold support pallet.

4. A method as claimed in claim 3, wherein base curve mold support pallets are alternated in delivery with front curve mold support pallets in a pallet delivery system.

5. A method as claimed in claim 1, wherein the support plate and array of deposition tubes positioned therein are vertically reciprocated between raised and lowered positions, and in the lowered position, the array of deposition tubes is placed above the array of base curve molds, and each deposition tube picks up and supports by a vacuum a base curve mold, and each deposition tube is angularly rotatably mounted in the support plate, and a common angular rotational drive is coupled to each of the deposition tubes in the array to angular index each of the deposition tubes to a precise angular position in the support plate.

6. A method as claimed in claim 5, wherein the common angular rotational drive is driven by a stepper motor.

7. A method as claimed in claim 6, wherein the stepper motor is controlled by a program to change the selected angularly indexed position.

8. A method as claimed in claim 6, wherein the stepper motor drives moveable racks and the deposition tubes include pinion gears driven by the moveable racks.

9. A method as claimed in claim 8, wherein the regular array includes a 2×4 array, and each movable rack drives a 1×4 array of deposition tubes driven by a pinion gear coupled to each deposition tube.

10. A method as claimed in claim 1, wherein each base curve mold defines a toric surface, the angular position of which is precisely angularly indexed relative to a front curve mold to form a mold for a toric lens.

11. Apparatus for producing a plurality of molded lenses, each lens having a first optical surface and a second optical surface which is precisely angularly indexed to a precise angular position relative to the first optical surface, comprising:
    a. a front curve support pallet for supporting a plurality of front curve molds in a regular array and disposed at a first station;
    b. means for supporting a plurality of base curve molds in a regular array at the first station;

c. means for transporting the front curve and base curve molds to a second station for production of the plurality of lenses;

d. a depositing means for depositing a dosed amount of monomer mixture into each of the plurality of front curve molds at the second station;

e. a support plate for rotationally supporting an array of deposition tubes at the second station which are coupled to a vacuum source to pick up and support the array of base curve molds;

f. means for angularly rotating each of the deposition tubes relative to the support plate to a selected angularly indexed position in the support plate; and g. an assembly sub-station disposed within the second station for placing the array of angularly indexed base curve molds over the array of front curve molds with the dosed amount of monomer therebetween, such that each base curve mold is in a precisely angularly indexed position relative to a front curve mold to produce the plurality of lenses, each lens having first and second optical surfaces which are precisely angularly indexed relative to each other.

12. Apparatus as claimed in claim 11, wherein the plurality of base curve molds are arranged in a regular array in a base curve mold support pallet.

13. Apparatus as claimed in claim 12, wherein a pallet delivery system alternates delivery of base curve mold support pallets with front curve mold support pallets.

14. Apparatus as claimed in claim 11, further including a vertical drive for vertically reciprocating the support plate and array of deposition tubes positioned therein between raised and lowered positions, and in the lowered position, the array of deposition tubes is placed above the array of base curve molds, and each deposition tube picks up and supports a base curve mold by a vacuum, and each deposition tube is angularly rotatably mounted in the support plate, and a common angular rotational drive is coupled to each of the deposition tubes in the array to angularly index each of the deposition tubes to a selected angular position in the support plate.

15. Apparatus as claimed in claim 14, wherein the common angular rotational drive includes a stepper motor.

16. Apparatus as claimed in claim 15, wherein the stepper motor is controlled by a program to change the selected angularly indexed position.

17. Apparatus as claimed in claim 16, wherein the stepper motor drives moveable racks and the deposition tubes include pinion gears driven by the moveable racks.

18. Apparatus as claimed in claim 11, wherein each front mold curve support pallet supports a 2×4 array of front base mold curves, each base mold curve support pallet supports a 2×4 array of base mold curves, and each moveable rack drives a 1×4 array of deposition tubes driven by pinion gears coupled thereto.

19. Apparatus as claimed in claim 11, wherein a molded base curve frame forms an array of toric base curve molds, each of which is in a neutral position, prior to said angularly rotating means rotating each toric base curve mold to a selected angle before assembly of the front and base curve molds.

20. Apparatus as claimed in claim 11 wherein said supporting means includes a toric base curve mold support pallet for supporting an array of toric base curve molds in neutral positions, prior to said angularly rotating means angularly rotating each toric base curve mold to a selected angle before assembly of the front and base curve molds.

21. Apparatus as claimed in claim 11, wherein each deposition tube in the array of deposition tubes is supported by a pneumatic piston and cylinder drive element.

22. Apparatus as claimed in claim 11, further including means for vertically reciprocating the support plate and array of deposition tubes positioned therein between raised and lowered positions.

23. Apparatus as claimed in claim 11, including means for assembling the toric base curve molds and front curve molds with a prescribed angular orientation in a one step assembly operation.

24. The method of claim 1, further comprising the step of transporting the base curve and front curve molds back to the first station after production of the plurality of lenses at the second station.

25. The apparatus of claim 11, further comprising means for transporting the base curve and front curve molds back to the first station after production of the plurality of lenses at the second station.

* * * * *